(12) United States Patent
Fife et al.

(10) Patent No.: US 9,191,689 B2
(45) Date of Patent: Nov. 17, 2015

(54) SYSTEMS AND METHODS FOR TRANSLATING GENERIC REQUESTS INTO DEVICE SPECIFIC REQUESTS BASED ON LOCATION INFORMATION

(71) Applicant: Rovi Guides, Inc., Santa Clara, CA (US)

(72) Inventors: Brian Fife, Concord, MA (US); Neel Suhas Ketkar, Santa Monica, CA (US)

(73) Assignee: Rovi Guides, Inc., Santa Clara, CA (US)

( * ) Notice: Subject to any disclaimer, the term of this patent is extended or adjusted under 35 U.S.C. 154(b) by 511 days.

(21) Appl. No.: 13/725,392

(22) Filed: Dec. 21, 2012

(65) Prior Publication Data

US 2014/0181855 A1    Jun. 26, 2014

(51) Int. Cl.
| | |
|---|---|
| H04N 21/258 | (2011.01) |
| H04N 21/426 | (2011.01) |
| H04N 21/472 | (2011.01) |
| H04N 21/6543 | (2011.01) |
| H04N 21/41 | (2011.01) |

(52) U.S. Cl.
CPC ... *H04N 21/25841* (2013.01); *H04N 21/25875* (2013.01); *H04N 21/4126* (2013.01); *H04N 21/42684* (2013.01); *H04N 21/472* (2013.01); *H04N 21/6543* (2013.01)

(58) Field of Classification Search
CPC .................. H04N 21/25841; H04N 21/25875; H04N 21/4126; H04N 21/42684; H04N 21/472; H04N 21/6543
See application file for complete search history.

(56) References Cited

U.S. PATENT DOCUMENTS

| | | | |
|---|---|---|---|
| 7,624,166 B2 | 11/2009 | Foote et al. | |
| 7,917,933 B2 | 3/2011 | Thomas et al. | |
| 2005/0096753 A1* | 5/2005 | Arling et al. | 700/11 |
| 2006/0053447 A1* | 3/2006 | Krzyzanowski et al. | 725/40 |
| 2010/0095332 A1* | 4/2010 | Gran et al. | 725/93 |
| 2010/0186034 A1 | 7/2010 | Walker | |
| 2010/0186038 A1 | 7/2010 | Thomas et al. | |
| 2011/0131398 A1* | 6/2011 | Chaturvedi et al. | 713/1 |
| 2011/0298596 A1* | 12/2011 | Warrick | 340/12.53 |
| 2012/0084814 A1 | 4/2012 | Olague et al. | |
| 2012/0117598 A1* | 5/2012 | Pons et al. | 725/40 |
| 2012/0319825 A1 | 12/2012 | Shimy et al. | |
| 2013/0165164 A1* | 6/2013 | Rowe | 455/466 |
| 2014/0250480 A1* | 9/2014 | Koh et al. | 725/110 |

* cited by examiner

*Primary Examiner* — Pankaj Kumar
*Assistant Examiner* — Alexander Boyd
(74) *Attorney, Agent, or Firm* — Ropes & Gray LLP

(57) ABSTRACT

Systems and methods for translating generic requests into requests specific to user media devices selected based on location are provided. In some embodiments, a first instruction data structure containing a request for an action to be performed on media content is received from a user equipment device. A location for the user equipment device is determined and a user media device is selected based on its proximity to the determined location. Device specific information for the selected user media device is then used to determine whether the selected user media device is authorized to perform the requested action. The device specific information is also used to translate the first instruction data structure into a second instruction data structure. The second instruction data structure is then transmitted to the selected user media device and causes the selected user media device to perform the requested action.

18 Claims, 9 Drawing Sheets

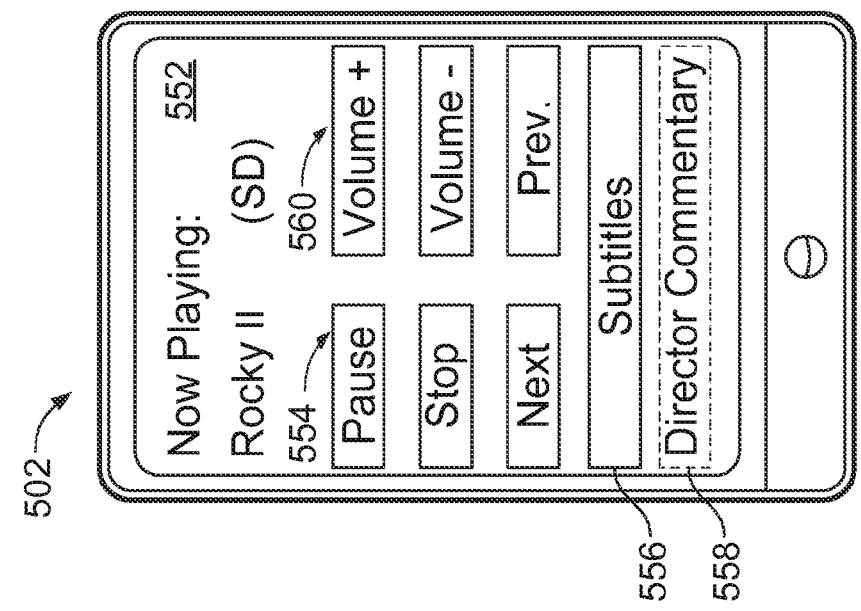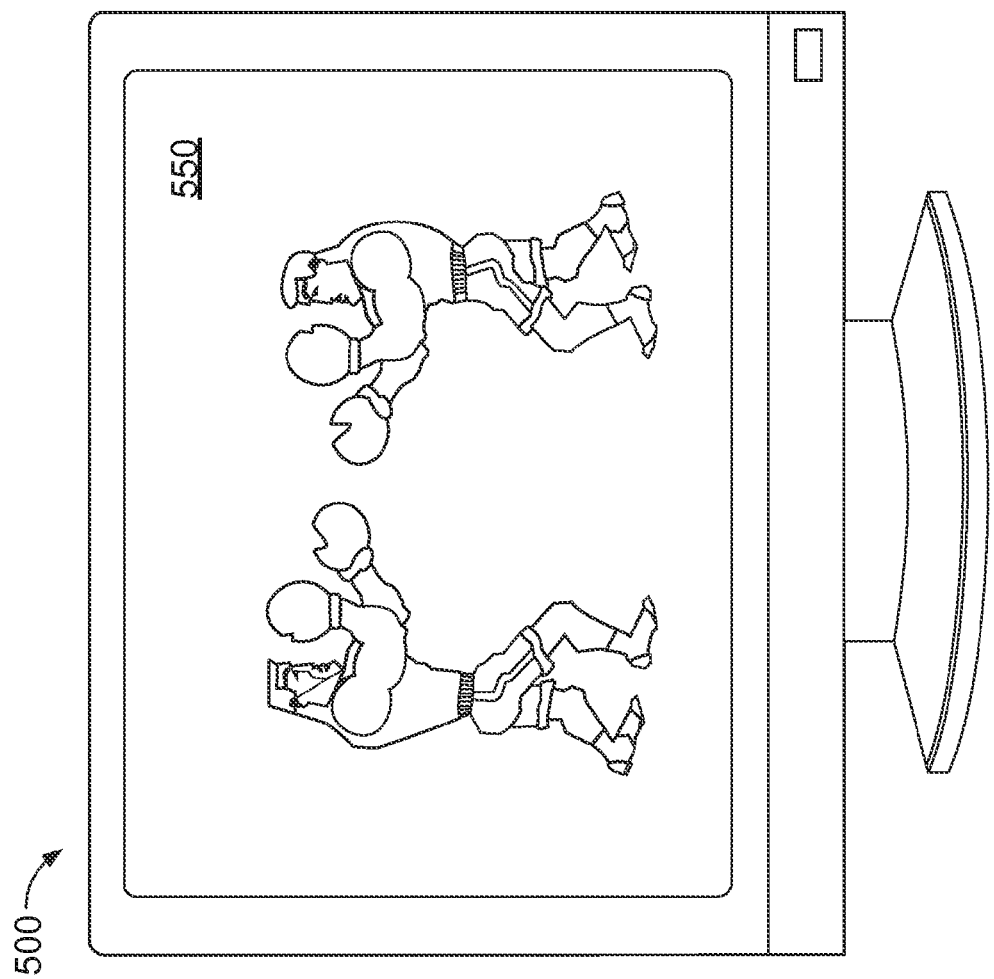
FIG. 5B

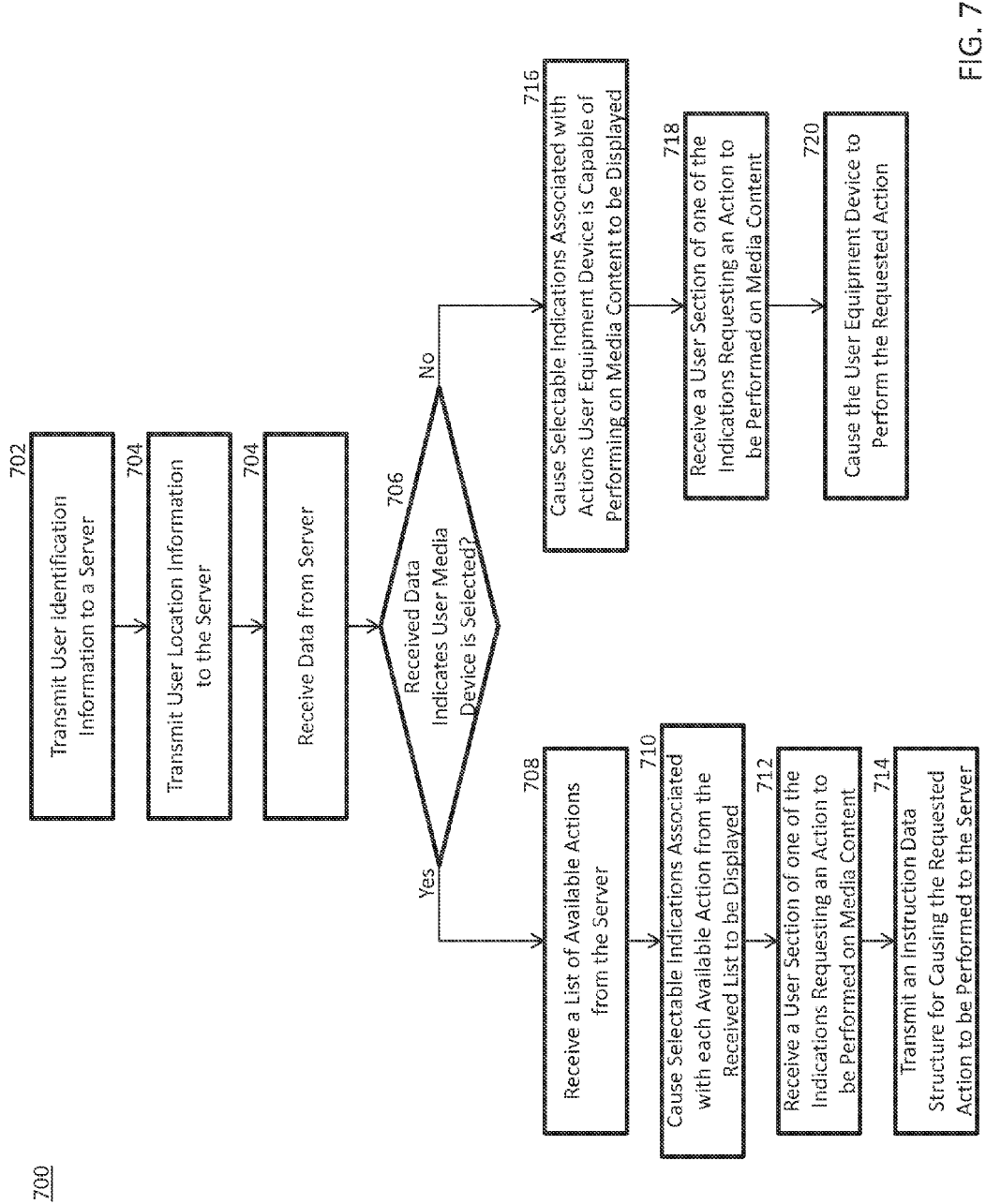

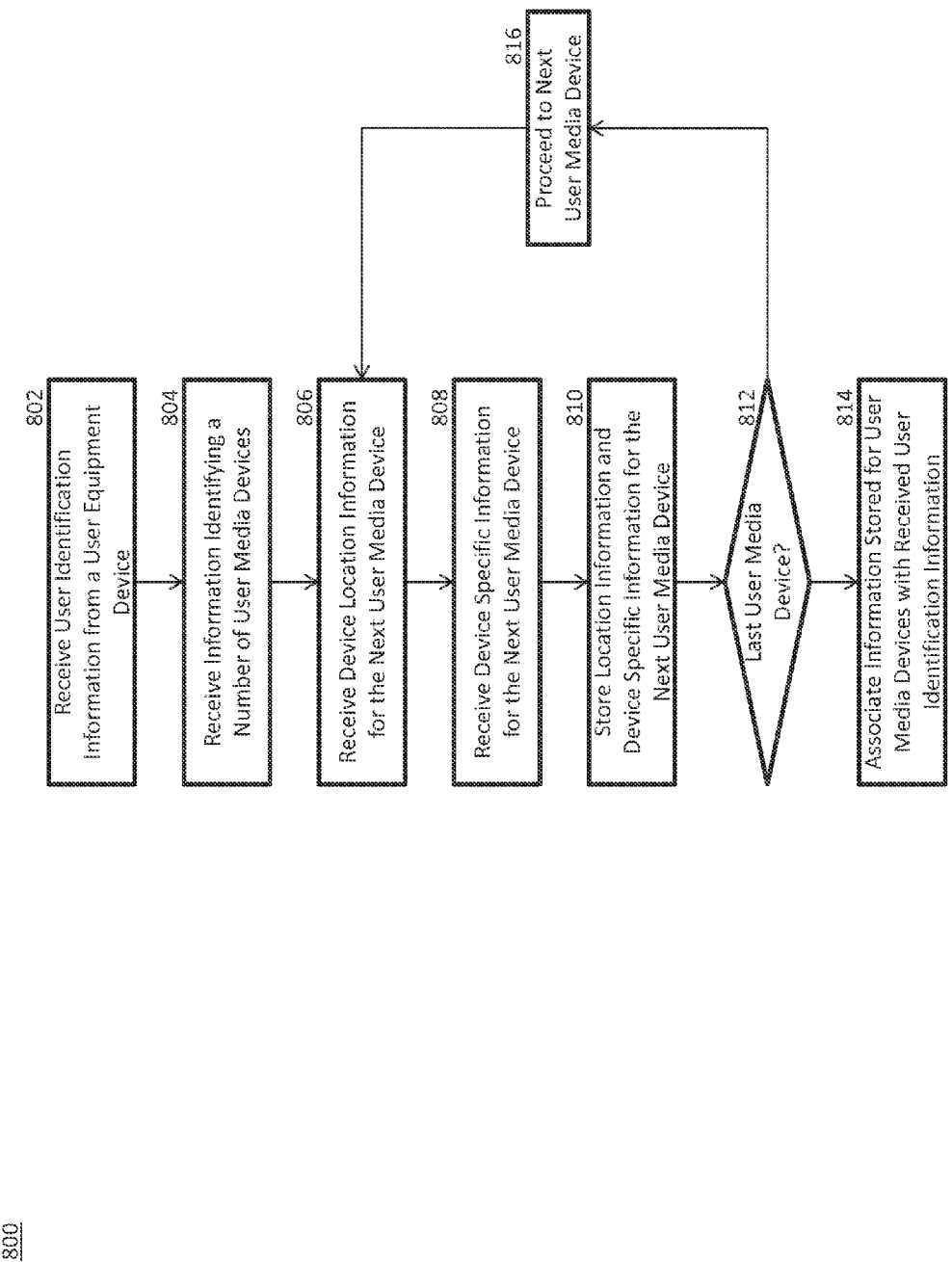

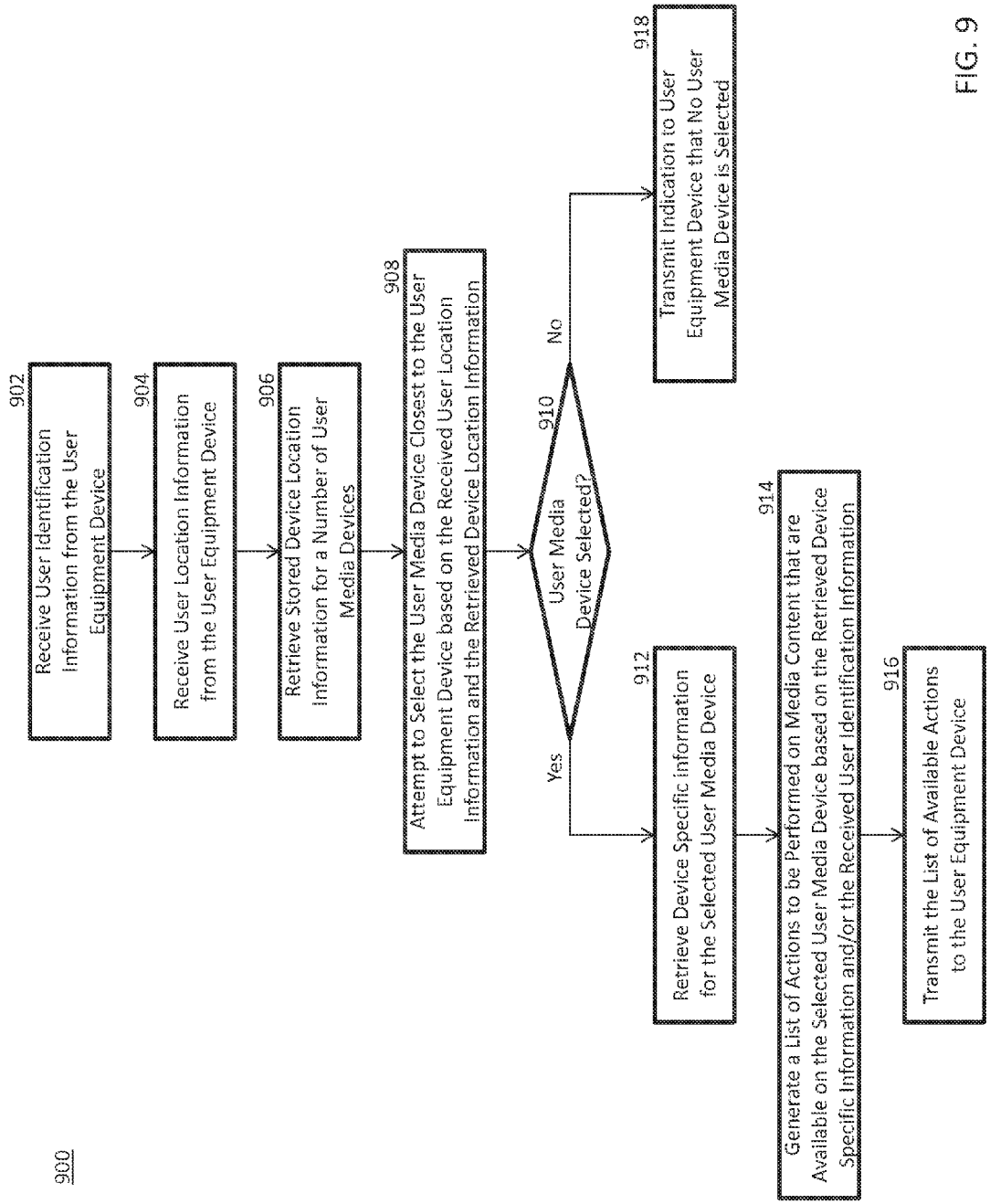

SYSTEMS AND METHODS FOR TRANSLATING GENERIC REQUESTS INTO DEVICE SPECIFIC REQUESTS BASED ON LOCATION INFORMATION

BACKGROUND

A user can play media content on an ever-increasing number of user media devices: mobile phones, televisions, computers and radios, just to name a few. No matter where the user may be, chances are that there are a number of these user media devices in the vicinity. For example, at home a user has a choice between watching the same movie in the living room on a television set, in the home office on a computer, or while doing chores throughout the house on a mobile media device.

Furthermore, user media devices are oftentimes connected to other devices via a local network, such as a home network, or a wide area network, such as the Internet. In the example above, the movie may thus be provided by an Internet media service and may be accessible from the user's television set, computer or mobile media device.

SUMMARY

In view of the foregoing, systems and methods for selecting a user media device based on user location and for translating generic requests into requests specific to the user media device are provided.

In some embodiments, a first instruction data structure containing a request for an action to be performed on media content is received from a user equipment device. A location for the user equipment device is determined, and a user media device of a plurality of user media devices that is closer in proximity to the determined location than another user media device of the plurality is selected. Device specific information for the selected user media device is retrieved and used to determine whether the user media device is authorized to perform the requested action. The device specific information is also used to translate the first instruction data structure into a second instruction data structure containing a request for the selected user media device to perform the requested action. The second instruction data structure is then transmitted to the selected user media device and causes the selected user media device to perform the requested action.

In some embodiments, a request to log into a first user account is received and the selected user media device is associated with a second user account. The first user account has access to a first version of a media asset, while the second user account has access to a second version of the media asset but does not have access to the first version. A request to play the first version of the media asset is received and, upon determining that the second user account does not have access to the first version, the second instruction data structure is populated with instructions to play the second version of the media asset.

In some embodiments, translating the first instruction data structure involves selecting a template data structure appropriate for the selected user media device based on retrieved device specific information and populating the template data structure to generate the second instruction data structure. In some embodiments, translating the first instruction data structure involves populating an address field of the second instruction data structure based on retrieved device specific information.

In some embodiments, it is determined whether the selected user media device is authorized to perform the requested action prior to receipt of the first instruction data structure. In these embodiments, a set of actions the first user device is authorized to perform may be determined based on the retrieved device specific information and transmitted to the user equipment device. This may cause the user equipment device to display a selectable indication associated with each action of the set, and a user selection of one of these indications may cause the user equipment device to transmit the first instruction data structure.

In some embodiments, the plurality of user media devices may be identified by scanning a home network.

In some embodiments, a request for location information may be transmitted to each user media device of the plurality of user media devices, and, in response, location information may be received from each user media device and stored.

In some embodiments, a request for device specific information may be transmitted to a user media device and the device specific information may be received from the user media device. In some embodiments, information identifying a user media device may be received, and the information may be used to retrieve device specific information for the user media device from a remote server.

BRIEF DESCRIPTION OF THE DRAWINGS

The above and other features of the present application, its nature and various advantages will become more apparent upon consideration of the following detailed description, taken in conjunction with the accompanying drawings, in which like reference characters refer to like parts throughout, and in which:

FIGS. 5A and 5B show illustrative display screens of a user media device and a user equipment device controlling the user media device;

FIG. 7 is a flow chart of a process for allowing a user equipment device to control a user media device;

FIG. 8 is a flow chart of a process for collecting information on the location of user media devices;

FIG. 9 is a flow chart of a process for selecting a user media device based on the location of a user equipment device.

DETAILED DESCRIPTION OF EMBODIMENTS

Figure 1:
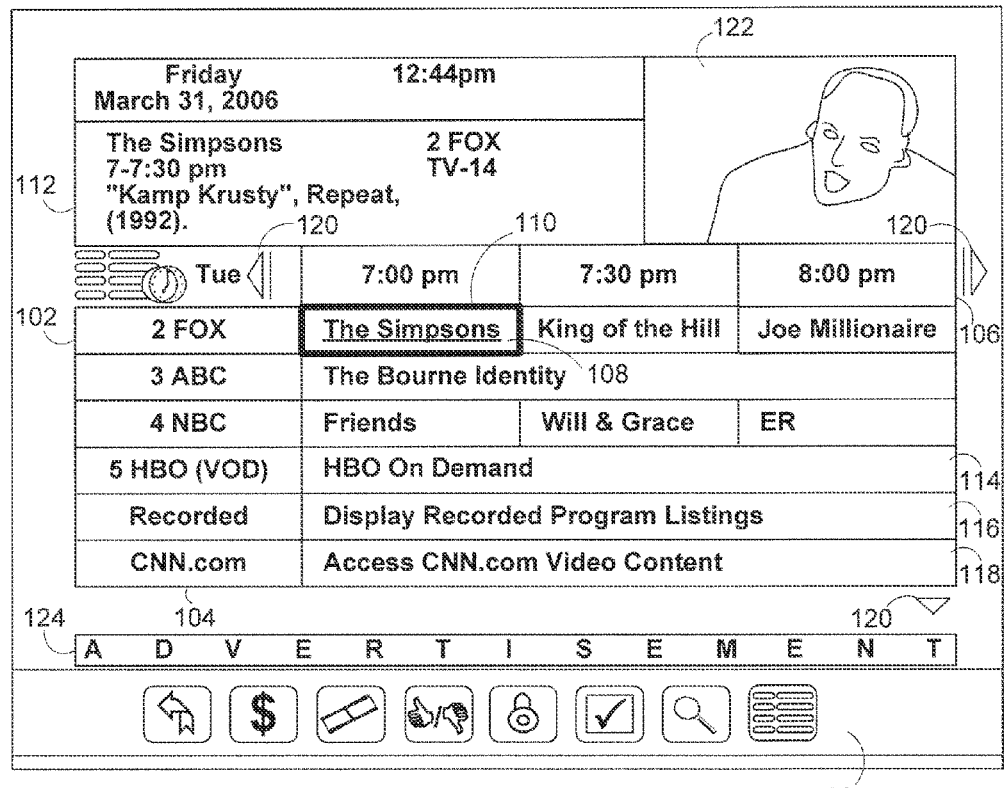
FIGS. 1 and 2 show illustrative display screens that may be used to provide media guidance application listings in accordance with some embodiments of the invention.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user media device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as online applications (i.e., provided on a web-site), or as stand-alone applications or clients on user equipment devices. Various devices and platforms that may implement media guidance applications are described in more detail below.

In the context of this application, user devices that are used to play or otherwise provide media content are referred to as user media devices, while devices used to interact with the media content, media guidance application and/or another application are referred to as user equipment devices. This distinction is only introduced to facilitate readability, and does not indicate an actual difference in devices or their capabilities. A user media device may also act as a user equipment device, and vice versa.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

FIGS. 1-2 and FIGS. 5A-5B show illustrative display screens that may be used to provide media guidance data. The display screens shown in FIGS. 1-2 and FIGS. 5A-5B may be implemented on any suitable user equipment device or platform. While the displays of FIGS. 1-2 and FIGS. 5A-5B are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

In combination with or instead of the listings, options, regions, features and advertisements discussed above, a display generated by the media guidance application may include options for controlling the playing, display and/or presentation of media content. For example, the media guidance application may receive user input for pausing the display of an on-demand movie, for requesting supplemental content (e.g., a director commentary or closed captions), or for altering the brightness or quality of a displayed movie. The options displayed may depend on the type of media currently playing. For example, for on-demand content the media guidance application may display trick-play options, for downloaded or recorded media the media guidance application may display options to manipulate the file containing the media content, and for media content streamed over an Internet connection the media guidance application may display options to control the quality of the played media. The media content being controlled may have been selected by a user through the media guidance application, or another application, and may have been broadcast or narrowcast by a service provider and/or may otherwise be the currently active media content.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Figure 2:
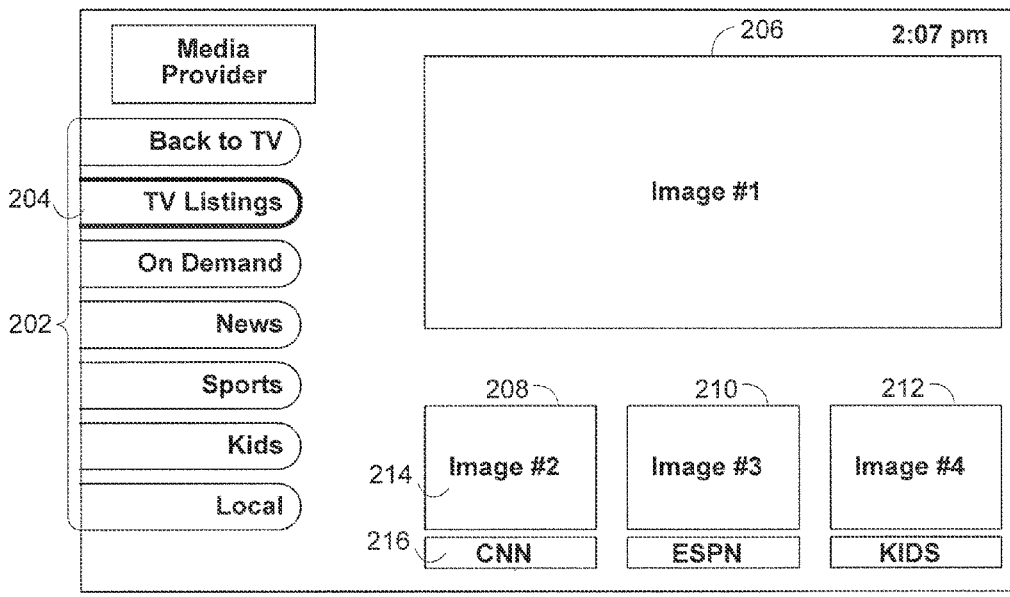

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
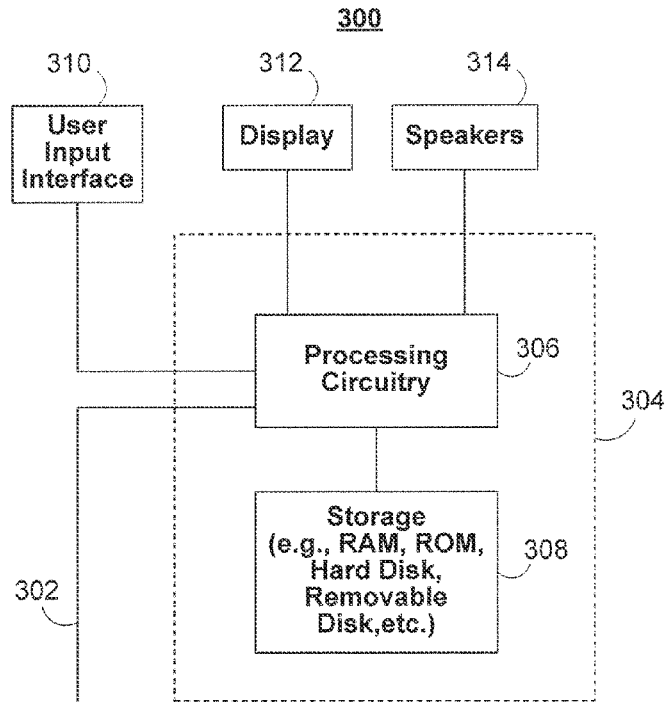
FIG. 3 shows an illustrative user equipment device in accordance with some embodiments of the invention.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

User equipment device 300 may also contain hardware, firmware and/or software to enable user equipment device 300 to determine its current location. Location may be determined in an absolute sense by, for example, calculating the longitude and latitude of the location of user equipment device 300. This may be accomplished by having control circuitry 304 process location information received from a GPS chip included in user equipment device 300. User equipment device 300 may also determine its location relative to the location of other devices. For example, control circuitry 304 may monitor the strength or time-delay of signals received from other devices in order to calculate the distance between user equipment device 300 and the device transmitting the signal. Control circuitry 304 may also use this information to determine which of multiple other devices is the closest to and furthest away from user equipment device 300. Alternatively or in combination, control circuitry 304 may detect the presence of a Doppler shift in a signal received from another device, use this information to calculate the velocity with which the two devices are approaching each other, and continuously integrate this velocity (starting from a moment in time the devices were in close proximity) in order to keep track of the distance between user equipment device 300 and the device transmitting the signal.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
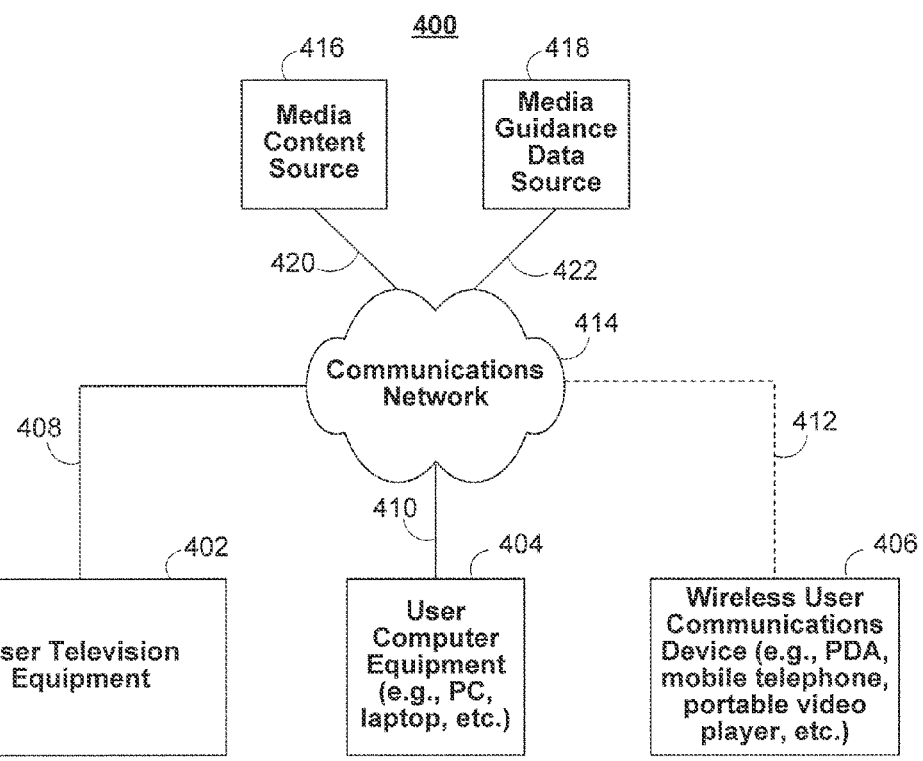
FIG. 4 is a diagram of an illustrative cross-platform interactive media system in accordance with some embodiments of the invention.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user media devices, user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

As will be further discussed below in reference to FIGS. 5A-5B, a user equipment device acting as a second screen device may control the display of media content on another user media device (e.g., user television equipment 402, user computer equipment 404, wireless user communications device 406). The media guidance application may generate a user interface (such as the user interfaces discussed above in reference to FIGS. 1-2) for display on the user equipment device, with user input received through the user equipment device and the media guidance application controlling another user media device. Such control may involve selection of media content to be displayed by the user media device or may provide options for interacting with media content already displayed on the user media device. For example, wireless user communications device 406 may receive user input selecting media content to be displayed on user television equipment 402, or wireless user communications device 406 may receive user input pausing media content currently displayed on user television equipment 402.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed).

Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

The media guidance application may also be implemented partially as a client application on control circuitry of multiple user media and equipment devices. In the context of a user equipment device (such as wireless user communications device 406) acting as a second screen device for another user media device (such as user television equipment 402), client applications of the media guidance application may be implemented on both the control circuitry of the user equipment device and the control circuitry of the user media device. The client application implemented on the user equipment device may transmit instruction data structures for controlling the user media device, either directly or through communications network 414, to the client application implemented on the user media device. These instruction data structures may contain a request for an action to be performed by the user media device on media content. The client application implemented on the user media device may then cause the user media device to perform the requested action. Alternatively, the user media device may be able to receive an instruction data structure and perform requested actions without having implemented a client application of the media guidance application on it.

The processing involved in having a user equipment device act as a second screen device for controlling another user media device may also be partially or fully performed by a server application of the media guidance application running on control circuitry of a remote server (e.g., media guidance data source 418 or a local media server of a home network). The user equipment device acting as the second screen device may thus transmit an instruction data structure containing a request for an action to be performed on media content to the remote server. The server application may then transmit either the received instruction data structure or an instruction data structure generated by the server application to a user media device for causing the user media device to perform the requested action. The user equipment device acting as a second screen device may thus be agnostic to the user media device that actually performs the requested action and transmit only a generic instruction data structure to the remote server. The server application running on the control circuitry of the remote server may then translate the generic instruction data structure into an instruction data structure specific to the user media device that will perform the requested action.

The media guidance application may consist of instructions stored in storage 308 or received from media guidance data source 418 that, when executed by control circuitry 304, cause user equipment device 300 to perform some or all the steps involved in the systems and methods described herein. Alternatively or in combination, the media guidance application may consist of instructions stored in the memory of media guidance data source 418 or a local media server of a home network that, when executed by control circuitry of media guidance data source 418 or the local media server, cause media guidance data source 418 or the local media server to perform some or all the steps involved in the systems and methods described herein. Actions discussed herein as being performed by the media guidance application are understood to involve loading instructions of the media guidance application to registers of control circuitry 304 and/or other control circuitry and the control circuitry executing these instructions to cause user equipment device 300, media guidance data source 418 and/or the local media server to perform the action described therein.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5A:
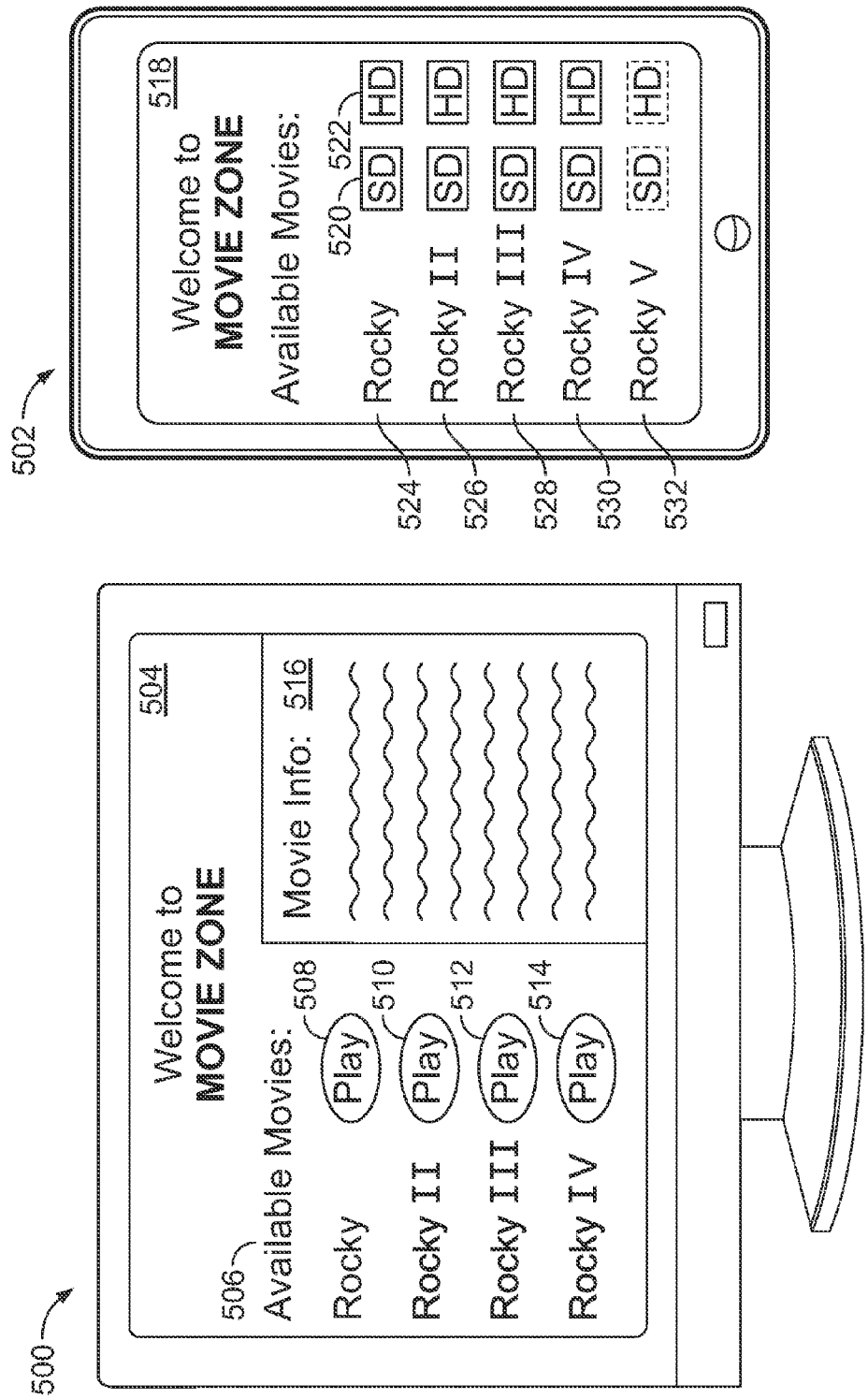

FIG. 5A illustrates user media device 500 displaying user interface 504 of the media guidance application and user equipment device 502 displaying user interface 518 of the media guidance application. These may be completely separate instances of the media guidance application, two peer applications that constantly communicate with each other or two client applications that communicate with a common server application. User interface 504 includes information region 516 and options regions 506. While in FIG. 5A user media device 500 is illustrated as user television equipment 402 and user equipment device 502 is illustrated as wireless user communications device 406, both user media device 500 and user equipment device 502 can be any one of user television equipment 402, user computer equipment 404 and wireless user communications device 406. In response to receiving a user selection of one of selectable options 508-514 of options region 506, the media guidance application may cause user media device 500 to play a media asset corresponding to the selected option. User interface 518 includes option 520 and option 522 for each of media assets 524-532. In response to receiving a user selection of option 520 for a media asset, the media guidance application may cause user media device 500 to play a Standard Definition (SD) version of the media asset, and, in response to receiving a user selection of option 522 for the media asset, the media guidance application may cause user media device 500 to play a High Definition (HD) version of the media asset. User equipment device 502, through user interface 518 generated by the media guidance application, thus acts as a second screen device for controlling user media device 500.

In FIG. 5A, both user equipment device 502 and user media device 500 have an active instance of the media guidance application that generates the displayed user interfaces. In other embodiments, another application may be running on user media device 500, and the media guidance application may become active only in response to receiving requests (directly or indirectly) from user equipment device 502. Such a request may cause user media device 500 to initialize the media guidance application implemented on user media device 500 and begin a second screen session during which user equipment device 502 transmits instruction data structures for controlling user media device 500. For example, user media device 500 may be playing a broadcast movie until an instruction data structure is received for causing user media device 500 to initialize an instance of the media guidance application, establish a connection to a remote server running a server application of the media guidance application (e.g., media content source 416 or a local media server of a home network) and/or establish a direct or indirect connection to user equipment device 502 for commencing a second screen session. The request received (directly or indirectly) from user equipment device 502 may also cause user media device 500 to perform an action on media content directly, with or without a client application of the media guidance application being implemented on user media device 500. For example, user media device 500 may be streaming media content over an Internet connection until an instruction data structure is received for causing user media device 500 to begin playing a cable video-on-demand movie selected by a user via an interface displayed on user equipment device 502. In this example, user media device 500 may be able to perform the requested action without running an instance of the media guidance application.

The request transmitted by user equipment device 502 and received by user equipment device 500 may be contained within an instruction data structure. The instruction data structure may include information identifying user media device 502, identifying user equipment device 500, identifying media content to be displayed, identifying media content source 416 from which the media content is to be received and/or retrieved, identifying a user associated with user equipment device 502 and/or user media device 500, identifying a user account associated with a media service (e.g., media content source 416) and/or identifying an action that is to be performed on the media content (e.g., play, select, pause and provide supplemental content). The instruction data structure may be a generic instruction data structure that does not contain any information identifying user media device 500 (e.g., an IP or other type of network address associated with user media device) and/or that was not generated specifically for transmission to user media device 500. This may be sufficient in situations where user media device 500 is designated as the target device based on transmission scheme, such as when the user equipment device 502 transmits data and user media device 500 receives data at a particular frequency. In that example, user equipment device 502 can broadcast the generic instruction data structure without specifically targeting user media device 500.

The instruction data structure transmitted and received may also be specific to user media device 500 (i.e., a device specific instruction data structure). For example, the instruction data structure may include information identifying user media device 500 (e.g., an IP or other type of network address associated with user media device), may consist of bit-fields and/or contain tags expected by user media device 500, and/or may be associated with information that allows the device specific instruction data structure to be routed through communications network 414 to user media device 504.

User equipment device 502 may also transmit a generic instruction data structure to a remote server (e.g., media guidance data source 418 or a local media server of a home network) with control circuitry running a server application of the media guidance application. The server application may then translate the generic instruction data structure into an instruction data structure specific to user media device 500 in the manner described in greater detail below in relation to FIG. 10, and transmit the device specific instruction data structure to user media device 500. Translating the generic instruction data structure may involve populating an instruction data structure based on device specific information received from user media device 500, received from user equipment device 502 via user input, retrieved from media guidance data source 418 and/or received from a third party server. Alternatively or in combination, device specific information may also be retrieved from media guidance source 418 or another remote server based on information identifying user media device 500 received from user media device 500, received from user equipment device 502 via user input and/or received from a third party server.

Alternatively or in combination, the collection of device specific information, generation of a device specific instruction data structure and/or transmission of the device specific instruction data structure to user media device 500 may be performed by an instance of the media guidance application running on user equipment device 502.

The device specific information may include information regarding actions and media content available to user media device 500, information identifying user media device 500, information regarding the type of instruction data structure expected by user media device 500 (e.g., appropriate bit-fields or tags), and/or a transmission scheme for transmitting an instruction data structure to user media device 500 (e.g., Internet, RF, IR and/or via the cable network). Once device specific information is received, the media guidance application may store it to the memory of either the device performing the processing (e.g., user equipment device 502, media guidance data source 418 or a local media server of a home network) or in a remote server (e.g., media guidance data source 418 or a local media server of a home network).

Generating a device specific instruction data structure may involve determining actions and media content available on user media device 500. While both user interface 504 of user media device 500 and user interface 518 of user equipment device 502 are generated by the media guidance application and relate to the same media service (e.g., media content source 416), the user equipment device 502 and user media device 500 may have access to different media assets, versions of media assets, supplemental content, viewing options and/or other features provided by the media guidance application and discussed above based on the hardware and/or software of the corresponding device and/or based on a user account associated with the corresponding device. For example, user interface 504 may include information region 516 while user interface 502 does not have an information region because the display of user media device 500 is larger than the display of user equipment device 502.

These differences in hardware and/or software of the devices and/or a user account associated the device may also impact the processing involved in allowing user equipment device 502 to act as a second screen device for controlling user media device 500. User equipment device may, for example, receive a user request for an action to be performed that user equipment device 502 is authorized to perform but that user media device 500 is not authorized to perform. User equipment device 502 and/or user media device 500 may or may not be authorized to perform a particular action due to constraints of the device's hardware or software and/or due to account permissions of a user account associated with the device. The media guidance application may generate user interface 518 with both options 520 for causing user media device 500 to play an SD version of a media asset and options 522 for causing user media device 500 to play an HD version of the media asset because user equipment device 502 is capable of playing either version or because the user, through his or her user account, theoretically has access to either version of the media asset. However, the hardware or software constraints and/or account permissions associated with user media device 500 may authorize user media device 500 to play only a single version (e.g., the SD version) of each media asset. This is reflected by the fact that there is only a single version of each of options 508-514. When user equipment device 502 receives a user selection of option 522 for media asset 524, the media guidance application may first determine that user media device 500 is not authorized to perform this action. This may involve transmitting an instruction data structure to user media device 500 requesting the action and receiving a response indicating that the action cannot be performed, or determining that the action cannot be performed based on device specific information. In response to determining that user media device 500 is not authorized to perform the requested action, the media guidance may cause user equipment device 502 to display a notification informing the user and/or may automatically cause user media device 500 to perform an alternative action.

Alternatively or in combination, the media guidance application may determine what actions user media device 500 is authorized to perform prior to receiving a user request for user media device 500 to perform one of these actions, and user interface 518 may reflect this determination. For example, the media guidance application may determine which media assets and versions thereof are available on user media device 500 when the second screen session is commenced and may generate user interface 518 accordingly. Thus, user interface 518 may indicate that options 520 and 522 for media asset 532 are not available by displaying these options "greyed out" or by otherwise indicating that user media device 500 is not authorized to perform the associated action. Alternatively, the media guidance application may display a notification and/or automatically select an alternative action in response to a user selection of these options without again determining whether user media device 500 is authorized to perform the associated actions. Finally, if the media guidance application determines that user media device 500 is not authorized to perform the associated actions, media equipment device 502 may not generate options 520 and 522 for media asset 532 when generating user interface 518.

Even after a media asset is selected and user media device 500 begins playing the selected media asset in screen 550, user equipment device 502 may act as a second screen device for controlling user media device 500. For this purpose, the media guidance application may generate user interface 552 which includes trick-play options 554, settings options 560 and supplemental content options 556 and 558.

User selections of options 554-560 are processed in the same manner as options 520 and 522 above to cause user media device 500 to perform the corresponding action. User equipment device 502 may thus control which part and at what rate a media asset is displayed by user media device 500, may affect display settings of user media device 500, and may cause user media device to display alternative or supplemental content. User media device 500 may display an indication each time a user selection of an option is received by user equipment device 502, or may perform the action without otherwise altering screen 550.

User media device 500 may also not be authorized to perform the actions associated with any one of options 554-560. This may be due to similar circumstances and/or the media guidance application may address this in a similar manner as discussed above in reference to user interface 518. Option 558 may thus be "greyed out" or otherwise indicated as unavailable because user media device 500 is not authorized to perform the action in a similar manner as options 520 and 522 for media asset 532 in user interface 518. This may be because, for example, a user account associated with user media device 500 does not have permission to display the supplemental content indicated in option 538 and/or because the version of the media asset currently displayed in screen 550 does not include that supplemental content (e.g., only the HD version of the media asset comes with the supplemental content). Furthermore, similar to options 522 in user interface 518, user interface 552 may include trick-play options 554 (or any other options potentially included in user interface 552) even though user media device 500 is not authorized to perform the associated actions. This may be because of characteristics of the media content displayed in screen 550 (e.g., the media content is broadcast media, and user media device 500 is incapable of performing trick-play actions on broadcast media, or because the user has selected a cheaper version of a media asset that does not include permission to perform trick-play actions), due to constraints of the hardware or software of user media device 500 and/or due to account permissions of a user account associated with user media device 500. As discussed above in reference to user interface 518, options associated with actions user media device 500 is not authorized to perform may be indicated as unavailable, may be included but, in response to receiving a user selection of one of these options, the media guidance application may determine that user media device 500 is not authorized to perform the associated action and cause a notification to be displayed, and/or might not be included by the media guidance application in user interface 552 when generating user interface 552.

User equipment device 502 may thus act as a remote or other type of input device for user media device 500. In fact, any type of input that could be directly received by user media device 500 may also be received through user equipment device 502 and cause user media device 500 to perform the corresponding action as if the input was directly received by user media device 500. For example, user input received by user equipment device 502 may cause user media device 500 to transverse a set of menus or to generate inputted text without the menus or text being displayed by user equipment device 502. Alternatively, the display of user equipment device 502 may mirror the display of user media device 500.

A user often has access to more than one user media device. As shown by floor plan 600 of FIG. 6A, a user may have access to user media device 610 in living room 606 (e.g., user television equipment 402) and user media device 608 in bedroom 602 (e.g., user computer equipment 404). Either of user media device 610 and user media device 608 may be controlled by user equipment device 502 in the same manner as user media device 500. Furthermore, even in bathroom 604, which does not have a user media device, a user may still be able to watch media content on user equipment device 502.

Therefore, when a user located within floor plan 600 is utilizing user equipment device 502 as a second screen device for controlling a user media device, the media guidance application has to determine which user media device is to be controlled and thus which user media device to transmit instruction data structures to: user media device 610 or user media device 608. In one embodiment, the media guidance application may receive a user selection indicating one of user media device 610 and user media device 608. Alternatively, the media guidance application may automatically select a user media device based on location.

As discussed above, user equipment device 502, user media device 608 and/or user media device 610 may each be able to determine their respective current locations. If user equipment device 502 is a mobile device held by a user, the location of user equipment device 502 may serve as a proxy for the location of the user. When selecting a user media device, the media guidance application may select the user media device closest to user equipment device 502, and thus the user. For example, when user equipment device 502 is at location 618, the media guidance application may determine that distance 620, the distance between user equipment device 502 and user media device 610, is shorter than distance 622, the distance between user equipment device 502 and user media device 608. Accordingly, the media guidance application may select user media device 610, and user equipment device 502 may thus act as a second screen device for controlling user media device 610. User selections received by user equipment device 502 would thus cause user media device 610 to perform a requested action, while user media device 608 would remain unaffected. Similarly, when user equipment device 502 is at location 612, the media guidance application may determine that distance 616, the distance between user equipment device 502 and user media device 610, is longer than distance 614, the distance between user equipment device 502 and user media device 608. Accordingly, in that scenario, the media guidance application may select user media device 608, and user equipment device 502 may thus act as a second screen device for controlling user media device 608. User selections received by user equipment device 502 would in that scenario cause user media device 608 to perform the requested action, while user media device 610 would remain unaffected. Further details regarding how the user media application may select a user media device are discussed below in connection with FIG. 9.

The media guidance application may identify user media device 608 and user media device 610 by receiving user input identifying each of user media device 608 and user media device 610. Alternatively, the media guidance application may identify user media device 608 and user media device 610 by scanning a network, such as a home network, in order to determine which devices are connected to the network. The media guidance application may receive location information for each of user media device 608 and user media device 610 by querying the respective devices. Alternatively, a user carrying user equipment device 502 may approach each of user media device 608 and user media device 610, and the media guidance application may receive a user selection of an indication when the user is in the vicinity of each of the two user media devices. The media guidance application may then save the location of user equipment device 502 at that time as the location of either user media device 608 or user media device 610. Further details regarding how user media devices are identified and how location information and/or device specific information for each of these user media devices is received are discussed below in connection with FIG. 8.

Figure 6A:
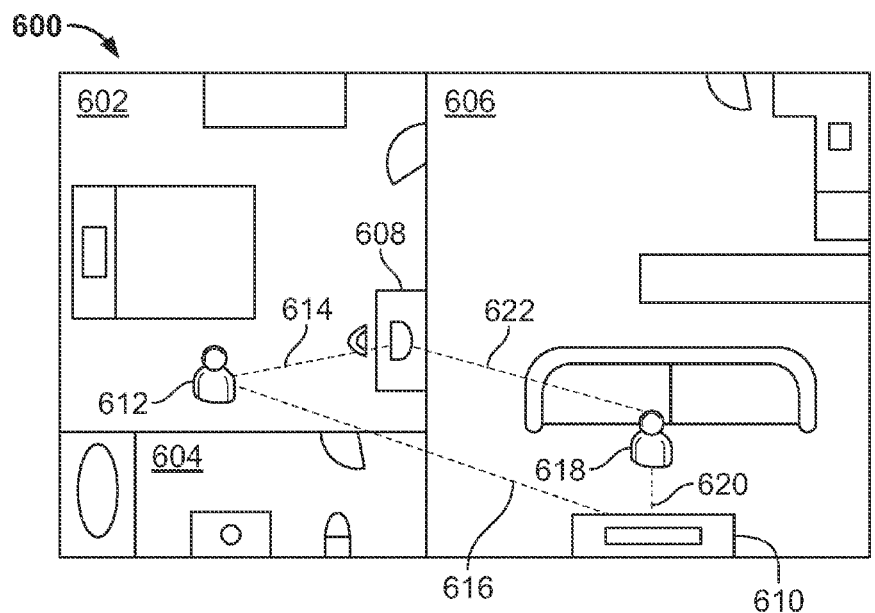
FIGS. 6A and 6B show floor plans for illustrating the selection of a user media device based on the location of a user equipment device.
Figure 6B:
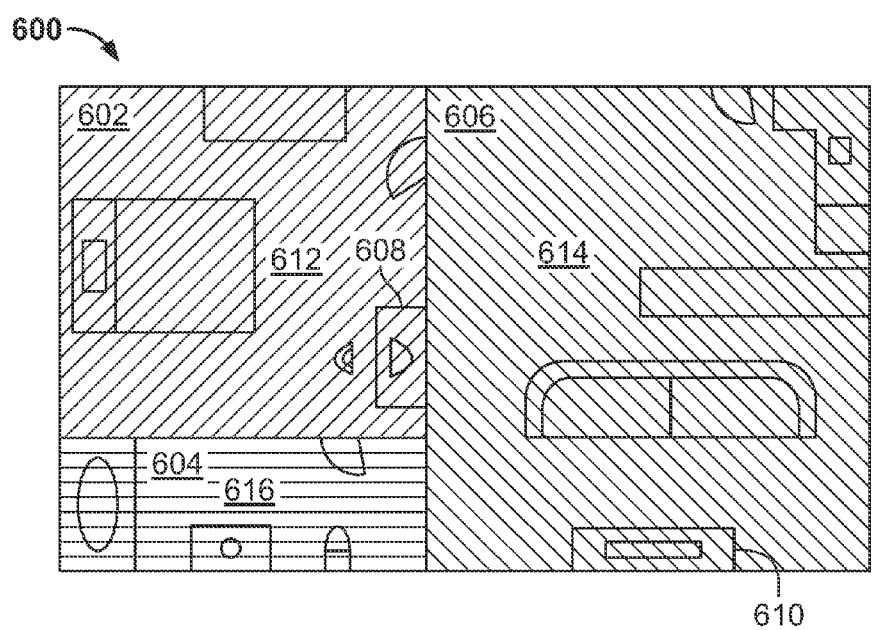

FIG. 6B illustrates an alternative embodiment for selecting between user media device 610 and user media device 608 when user equipment device 502 acts as a second screen device for controlling one of the user media devices. Here, floor plan 600 is divided into region 614 corresponding to living room 606, region 612 corresponding to bedroom 602, and region 616 corresponding to bathroom 604.

In this embodiment, instead of calculating distances between user equipment device 502 and user media device 610 or user media device 608, the media guide application may determine whether user equipment device 502 is located in region 614, region 612 or region 616. If user equipment device is located in region 614, user equipment device 502 may act as a second screen device for controlling user media device 610, while, if user equipment device is located in region 612, user equipment device 502 may act as a second screen device for controlling user media device 608.

The media guidance application may automatically determine the regions by collecting location information for user media device 608 and user media device 610 using the methods discussed above and then calculating regions in which a user equipment device would be closer to user media device 608 than user media device 610 and/or vice versa. Alternatively or in combination, the media guidance application may receive a user input identifying a radius for a region around user media device 608 and/or user media device 610. As a third alternative, the user may walk along the circumference of desired regions with user equipment device 502 while the media guidance application continuously or at particular points "records" the location of user equipment device 502. The media guidance application may thus receive data manually outlining regions either by receiving a continuous stream of location information or by receiving a set of location information points that the media guidance application may use to create the different regions or to calculate in which region user equipment device 502 is located when selecting a user media device.

The media guidance application may also select neither user media device 610 nor user media device 608. In the embodiment presented in connection with FIG. 6A, this may occur if user equipment device 502 is farther from either user media device 610 or user media device 608 than a default or user specified distance. In the embodiment presented in connection with FIG. 6B, this may occur if user equipment device 502 is either outside of all defined regions, such as region 612 or region 614, or within a region, such as region 616, that is not associated with either user media device 610 or user media device 608. In either embodiment, if the media guidance application does not select any user media device, actions requested by the user may be performed by user equipment device 502. For example, if the media guidance application receives a request to play a movie, and user equipment device 502 is in region 614, the media guidance application may cause user media device 610 to play the requested movie. However, if user equipment device 502 is within region 616, the media guidance application may cause user equipment device 502 to play the movie instead.

Furthermore, the embodiments discussed in connection with FIGS. 6A and 6B may be readily combined. For example, the media guidance application may use the selection embodiment discussed in connection with FIG. 6A unless the media guidance has received user input specifying different regions as discussed in connection with FIG. 6B.

Alternative or in combination, other factors for selecting a user media device may also be utilized. For example, the media guidance application may initially select a user media device as discussed above, but this selection may be overridden by user input. If user equipment device 502 has a direct wireless connection to one or more user media devices, such as by BLUETOOTH, the signal strength of these wireless connections may be used to select a user media device. In this example, if user media device 502 receives a stronger wireless signal from user media device 610 than from user media device 608, the media guidance application may select user media device 610, since a stronger signal may indicate that user equipment device 502 is closer to user media device 610 or that there are fewer obstructions between user equipment device 502 and user media device 610. Signal strength may also be used in combination with other selection methods. For example, the media guidance application may compare signal strength with a minimum threshold signal strength. In this example, even if user equipment device 502 is in region 614, if the strength of the signal received from user media device 610 is below the minimum threshold signal strength, the media guidance application may avoid selecting user media device 610. The media guidance application may also detect whether the user is within a perceivable range of a user media device, and use this information to select a user media device in whose perceivable range the user is located and/or eliminate from selection a user media device otherwise selected by another approach in whose perceivable range the user is not located. Detecting users within a perceivable range of a user media device is described in greater detail in Shimy et al., U.S. patent application Ser. No. 12/565,486, filed Sep. 23, 2009 and published on Mar. 24, 2011 as U.S. Patent Application Publication No. 2011/0069940, which is hereby incorporated by reference herein in its entirety.

FIGS. 7-10 are flowcharts illustrating processes 700, 800, 900 and 1000, respectively, involved in enabling user equipment device 502 to act as a second screen device for controlling a user media device. While these processes will be described as being executed by a client-server embodiment of the media guidance application, with process 700 being executed by a client application of the media guidance application running on control circuitry 304 of user equipment device 502 and processes 800, 900 and 1000 being executed by a server application of the media guidance application running on control circuitry of a server, such as media guidance data source 418 or a local media server of a home network (referred to as "the server" in the discussion of FIGS. 7-10 below), the methods and systems presented in this application are not limited to this embodiment. The steps of processes 700, 800, 900 and 1000 may all be executed by an instance of the media guidance application solely implemented on user equipment device 502 or may all be executed by an instance of the media guidance application solely implemented on the server. Furthermore, the steps of processes 700, 800, 900 and 1000 may be performed in any combination by a client application of the media guidance application running on control circuitry 304 of user equipment device 502 and a server application of the media guidance application running on the server.

In FIG. 7, at step 702 of process 700, the media guidance application transmits user identification information to the server. The user identification information may have been received through a user input or may have been stored locally. The user identification information may identify an account of the user associated with a media service, such as media content source 416. The user account may, in turn, indicate, through account access information stored in the memory of the server, media content source 416 and/or media guidance data source 418, what level of service a user has access to (e.g., trial-offer, regular member or premium service) and/or may indicate what media assets, versions of media assets and/or other features or actions a user, either through user equipment device 502 or another user media device, has access to.

The media guidance application may then transmit location information to the server at step 704. The location information may be transmitted together with the user identification information (potentially even in a single packet) or may be transmitted separately. The location information may indicate the absolute location of user equipment device 502 (e.g., the location information may consist of a longitude, latitude and altitude, or the location information may indicate that user equipment device is located within region 614) or may indicate the location of user equipment device 502 relative to the server or one or more user media device (e.g., the location information may contain the distance between user equipment device 502 and each of user media device 608 and user media device 610).

The media guidance application receives data from the server at step 704. The received data may specify a user media device (such as user media device 608 or user media device 610), may consist of a list of actions a user media device is authorized to perform (e.g., a list of media assets available for display on a selected user media device), and/or may indicate whether or not a user media device has been selected.

The media guidance application then determines at step 706 whether the data received at step 704 indicates that a user media device has been selected. For example, if an indication that no user media device was selected is received at step 704, the media guidance application may determine that no user media device was selected (for example, because the transmitted location information indicated that user equipment device 502 is located in region 616) and proceed to step 716, and if any other data is received the media guidance application may determine that a user media device was selected and proceed to step 708. Alternatively or in combination, the media guidance application may also determine whether an affirmative indication that a user media device was selected was received and only proceed to step 708 if such an affirmative indication was, in fact, received.

If the media guidance application determines at step 706 that no user media device was selected, the media guidance application may cause user equipment device 502 to display selectable indications associated with actions user equipment device 502 is authorized to perform. For example, user equipment device 502 may display listings for media assets available for display on user equipment device 502. The media guidance application may determine which actions user equipment device 502 is authorized to perform, retrieve a default list of actions from memory 308 or may receive a list of actions user equipment 502 is authorized to perform from the server.

The media guidance application may then receive a user selection of one of the displayed indications at step 718 and cause user equipment device 502 to perform the corresponding action at step 720. The media guidance application may thus, for example, receive a user selection of a media asset and cause user equipment device 502 to display the selected media asset. As another example, the media guidance application may receive a user selection of an indication associated with pausing the media content currently displayed on user equipment device 502 and cause user equipment device 502 to pause the display of the media content.

If, however, the media guidance application determines at step 706 that a user media device has been selected (e.g., user equipment device is located at location 618, and the server accordingly selects user media device 610), the media guidance application may receive a list of available actions that user media device 610 is authorized to perform. This list may also be received as part of or entirely making up the data received at step 704. Alternatively, the media guidance application may determine the list of available actions that user media device 610 is authorized to perform and/or may a load default list of actions from memory 308.

The media guidance application may then cause user equipment device 502 to display selectable indications associate with available actions user media device 610 is authorized to perform. The selectable indications may allow a user to select a media asset to be displayed by the selected user media device, select a version of a media asset, interact with media content currently displayed by the selected user media device, and/or change setting of user media device 610.

The media guidance application may receive a user selection of one of the displayed indications at step 716, and thus receive a user request for a corresponding action to be performed by user media device 610. In response, the media guidance application may generate a generic instruction data structure and transmit the generic instruction data structure to the server at step 714. The generated instruction data structure contains a request for the user selected action to be performed, and transmitting the generic instruction data structure may cause user media device 610 to perform the requested action. Alternatively, the media guidance application may generate a device specific instruction data structure as discussed in connection with steps 1006-1016 of process 1000 and may transmit this device specific instruction data structure directly to user media device 610.

The media guidance application may thus, for example, receive a user selection of a media asset and cause user media device 610 to display the selected media asset. As another example, the media guidance application may receive a user selection of an indication associated with pausing the media content currently displayed on user media device 610 and cause user media device 610 to pause the display of the media content.

The media guidance application may perform steps 712-714 or steps 718-720, depending on the result of the determination made at step 706, for as long as user equipment device 502 is acting as a second screen device for controlling a user media device or for as long as media content is displayed by user equipment device 502 itself, respectively.

Process 800 of FIG. 8 is an exemplary process executed by a server application of the media guidance application running on the server. Process 800 may be executed once and the collected information stored in the memory of the server, may be executed periodically to update information stored in the memory of the server, may be executed only in response to receiving a user request for its execution (e.g., when the user is aware of new user media devices that have recently been added to a home network) and/or may be executed every time user equipment device 502 is to act as a second screen for controlling a user media device (i.e., every time a second screen session is commenced).

The media guidance application may receive user identification information from user equipment device 502 at step 802. The media guidance application may attempt to retrieve a user profile from local memory or from content source 416 based on the received user identification information and/or may use the received user identification information to verify the identity of the user. If the media guidance application is unable to retrieve a user profile and/or verify the identity of the user, the media guidance application may transmit an indication to that extent or a request for further information to user equipment device 502.

The media guidance application may receive information identifying a number of user media devices (e.g., user media device 608 and user media device 610) at step 804. The information may consist of a network address or other information that may allow the media guidance application to communicate with user media device 608 and user media device 610. The information may consist of user input received through user equipment device 502. The information may also be obtained by scanning a network (e.g., communications network 414) in order to identify all user media devices present on that network. Alternatively or in combination, the information may also be received directly from each of user media device 608 and user media device 610. For example, each of user media device 608 and user media device 610 may receive a user request to install a client application of the media guidance application, to activate an already present client application and/or to otherwise register user media device 608 or user media device 610 with the media guidance application running on the server, and each of user media device 608 and user media device 610 may, in response to such a user request, transmit information identifying itself to the server.

The media guidance application may receive location information for a user media device (e.g., user media device 608) at step 806. The location information (e.g., information specifying the location of user media device 610 or information specifying region 614) may be received from user equipment device 502 or from user media device 608, and may be received separately from or together with the information identifying user media device 608. For example, user media device 608, when registering with the media guidance application running on the server, may also transmit its location information. In another example, the media guidance application may query user media device 608 for its location information. In a third example, the media guidance application may receive location information for user media device 608 from user equipment device 502 either in response to transmitting a message asking the user to stand in the vicinity of user media device 608 and select an indication or as part of the user inputted information identifying user media device 608. In a fourth example, the media guidance application may receive a stream or set of location information defining region 614 as discussed above in reference to FIG. 6B.

The media guidance application may receive device specific information for user media device 608 at step 808. The device specific information may specify an address of user media device 608 (e.g., an IP address), may specify a transmission scheme through which to communicate with user media device 608 (e.g., RF, via the Internet or over a location network), may specify attributes of a device specific instruction data structure for user media device 608 (e.g., appropriate bit-fields and tags), may include a template device specific instruction data structure, may indicate hardware and/or software capabilities of user media device 608 (e.g., user media device 608 may only be capable of displaying SD video), may indicate actions user media device 608 is authorized to perform (e.g., a list of available media assets, trick-play options and/or types of supplemental content) and/or may indicate an account associated with user media device 608 (e.g., user media device 608 may belong to a second user with a different account than the user of user equipment device 502 and/or a second user may be currently logged into user media device 608). Some or all of this information may be received together with the identifying information at step 804, may be user input received from user equipment device 502, may be user input received from user media device 608, may be received in response to querying user media device 608 and/or may be retrieved, potentially based on identifying information received at step 804, from content source 416, a server associated with user media device 608, a third party server and/or the memory of the server. Any of the device specific data listed above may be received in any manner, and not all device specific data may be collected. For example, the media guidance application may query identifying information received to determine a format of a device specific instruction data structure for user media device 608, retrieve information regarding whether user media device 608 is authorized to display HD video from a server associated with a manufacturer of user media device 608, and receive a network address for user media device 608 from user equipment device 502 as part of the identifying information received at step 804.

The media guidance application may then store the location information and device specific information collected for user media device 608 at step 810. The media guidance application may store the collected information either after all location and device specific information for user media device 608 has been collected or as the information is being received. The collected information can be stored to the memory of a server or to the memory of a database in communication with the server.

At step 812, the media guidance application may determine whether all available user media devices have been processed. This may involve determining whether all identifying information received at step 804 has been processed, continuing to scan communications network 414 to determine whether any other user media devices are connected to it, or transmitting a request to user equipment device 502 requesting information on the next user media device. The media guidance application may also skip this step in situations where a new user media device can be registered at any time through user input received by the new user media device or user equipment device 502. The media guidance application may proceed to the next user media device (e.g., user media device 610) at step 816.

While step 804 is illustrated as being performed once for multiple user media devices, and steps 806-810 are illustrated as being performed sequentially for each user media device, the methods and systems described herein are not thus limited. The media guidance application can also perform all of steps 804-810 for an individual user media device and only then repeat the steps for the next, perform each of steps 804-810 for all user media devices before proceeding to the next step, or any combination thereof. Furthermore, while process 800 discusses collecting and storing location and device specific information ahead of time, such information can also be collected using any methods discussed above on the fly and as needed during the execution of process 900 or 1000.

The media guidance application may associate all information stored at step 810 with the received user identification information at step 814. This may involve storing a pointer to the memory location where the collected information is stored to a user profile or transmitting a pointer to this memory location to user equipment device 502 for storage and subsequent re-transmission as part of user identification information. Alternatively, the media guidance application may associate the collected information with all users, and thus any received user identification information would be associated with the collected information. The collected information may also be associated with user identification information for a particular set of user (e.g., members of a family that all use the same user media devices), and a pointer to the memory location of the collected information may be stored to user profiles of each user of the set, or may be stored for a combined profile associated with the set of users. Upon subsequently receiving the same user identification information, the media guidance application may be able to retrieve the collected information from the memory it was stored to.

Process 900 of FIG. 9 is an exemplary process executed by a server application of the media guidance application running on the server. Process 900 may be executed at the commencement of every second screen session during which user equipment device 502 is to act as a second screen device for controlling a user media device and may select the user media device to be controlled.

The media guidance application may receive user identification information from user equipment device 502 at step 902. The user identification information may used by the media guidance application to retrieve location information and device specific information stored at step 810 of process 800 for a number of user media devices. At step 904, the media guidance application may also receive location information for user equipment device 502 from user equipment device 502. The received location information may be treated as a proxy for the location of the user.

The media guidance application may retrieve location information for one or more user media devices (e.g., user media device 608 and user media device 610), and use this information, in combination with the received location information for user equipment device 502, to select the user media device closest in proximity to user equipment device 502 at step 908. Retrieving location information may involve retrieving the information stored at step 810 of process 800, or receiving the information in the manner discussed above in reference to step 806 of process 800.

Steps 906 may be performed for all known user media devices prior to the execution of step 908. For example, the media guidance application may retrieve location information for both user media device 608 and user media device 610 at step 906 and calculate the distance between user equipment device 502 and each of user media device 608 and user media device 610. Then, at step 908, the media guidance application may compare all of the calculated distances to determine which of user media device 608 and user media device 610 is closest to user equipment device 502. In another example, the media guidance application may generate a look-up table indexed by possible locations or ranges of locations for user equipment device 502. The media guidance application may retrieve this table at step 906 and use it at step 908 to select a user media device. The media guidance application may also retrieve location information for only one user media device at a time, and determine whether to select that user media device prior to proceeding to the next user media device. For example, the media guidance application may retrieve information specifying region 614 for user media device 610 first and determine whether the location information received from user equipment device 502 places user equipment within that region. If user equipment device is located within region 614, the media guidance application may select user media device 610. Otherwise, the media guidance application may proceed to user media device 608 and repeat the comparison.

The media guidance application may determine at step 910 whether a user media device was selected at step 910. The media guidance application may set a pointer to information associated with a selected user media device initially to NULL and replace it with an actual value once a user media device is selected. Alternatively, the pointer or another variable may affirmatively indicate that no user media device is selected. This may be desirable when, for example, a region (e.g., region 616) affirmatively indicates that no user media device is to be selected. The media guidance application may also maintain a separate Boolean variable that is set to FALSE initially and changed to true once a user media device is selected and/or that is affirmatively set to TRUE or FALSE based on the result of step 908. In either case, the media guidance may then check that pointer or Boolean variable to determine whether a user media device has been selected at step 910.

If the media guidance application determines at step 910 that no user media device has been selected, the media guidance application may transmit an indication to user equipment device 502 that no user media device was selected. If the media guidance application determines at step 910 that a user media device has been selected (e.g., user media device 610), the media guidance application may retrieve device specific information for user media device 610. This may involve retrieving the device specific information stored at step 810 of process 800, or receiving the information in the manner discussed above in reference to step 808 of process 800.

At step 914, the retrieved device specific information and/or the received user identification information may be used to generate a list of available actions that user media device is authorized to perform. Generating the list may involve just looking up the list from the retrieved device specific information. Generating the list may also involve starting with a list of available actions based on permissions associated with the user account identified by the received user identification information, and then removing actions not available due to permissions associated with a user account that is associated with user media device 610. Alternatively, the media guidance application may start with a list of available actions based on permissions associated with the user account identified by the received user identification information, and then add actions available due to permissions associated with a user account that is associated with user media device 610. Either of these lists, as well as a list of available actions based on permissions associated with the user account identified by the received user identification information that has not been modified and/or a list of default available actions, may be further augmented or trimmed based on actions user media device 610 is authorized or not authorized to perform due to its hardware and/or software. Any list of available actions generated at step 914 is then transmitted to user equipment device 502 at step 916.

Figure 10:
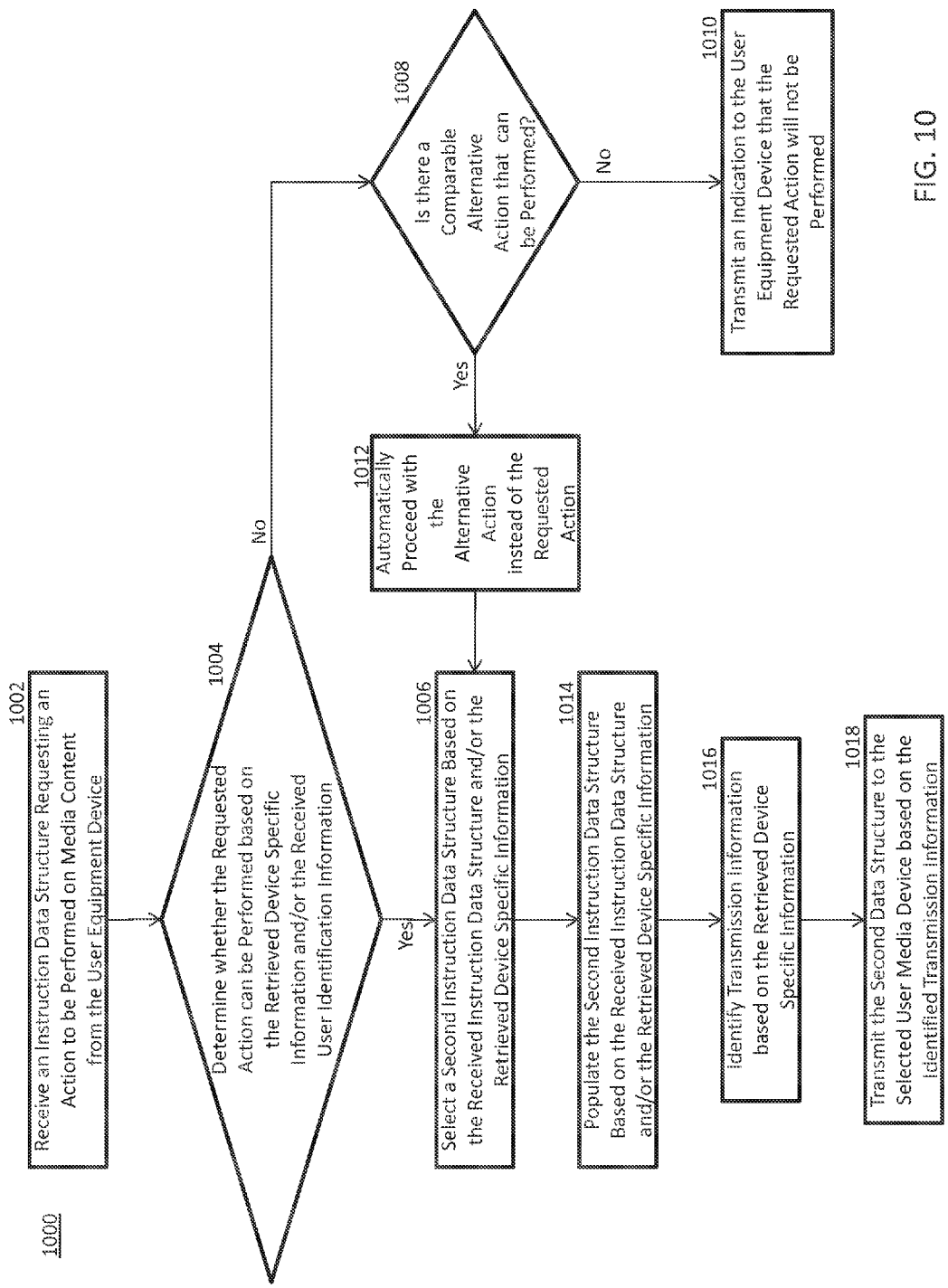
FIG. 10 is a flow chart of a process for translating received generic requests into user media device specific requests.

Process 1000 of FIG. 10 is an exemplary process executed by a server application of the media guidance application running on the server. Process 1000 may be executed every time user equipment device 502 receives a user selection requesting an action to be performed on media content and, in response, transmits an instruction data structure to the server. Process 1000 may then translate a generic instruction data structure into a device specific data structure for user media device 610.

The media guidance application receives an instruction data structure containing a request for a user selected action to be performed on media content at step 1002. Process 1000 assumes that this is a generic instruction data structure. However, as discussed above in connection with step 714 of process 700, user equipment device 502 may also transmit a device specific instruction data structure to the server, in which case the server may simply forward the device specific instruction data structure to user media device 610.

At step 1004, the media guidance application may determine whether the action requested by the received instruction data structure can be performed by user media device 610. The determination may involve comparing the requested action to the received user identification information or the retrieved device specific information. This may involve determining whether the user account identified in the received user identification information allows the requested action, whether a user account associated with user media device 610 allows the requested action, whether the hardware and/or software of user media device 610 is capable of performing the action and/or whether a list of available actions includes the requested actions (i.e., whether user media device 610 is authorized to perform the requested action). Factors taken into consideration by the media guidance application when generating a list of available actions at step 914 of process 900 potentially need not be considered. Alternatively, step 1004 may act as a "double-check" for step 914 of process 900.

If at step 1004 the media guidance application determines that user media device 610 cannot perform the requested action, the media guidance application may determine at step 1008 whether there is a comparable alternative action that can be performed. For example, if request to play an HD version of a media asset is received, but user media device 610 is incapable of playing HD video, the media guidance application may determine at step 1008 that playing an SD version of the same media asset is a comparable alternative action. Making this determination may involve generating a list of available actions user media device 610 is authorized to perform, comparing information associated with the requested action to information associated with alternative actions user media device 610 is authorized to perform and/or using a look-up table to identify a comparable alternative action.

In one embodiment, the media guidance application may even consider selecting an alternative user media device at step 1008. For example, if user media device 610 were in the vicinity of user media device 608, and user media device 610 were unable to perform a requested action that user media device 608 is authorized to perform, the media guidance application may determine that a comparable alternative to having user media device 610 perform the requested action would be to have user media device 608 perform the requested action instead, and may proceed accordingly.

If the media guidance application determines at step 1008 that no comparable alternative action can be performed by user media device 610, the media guidance application may transmit an indication to user equipment device 502 that the requested action will not be and/or cannot be performed at step 1010. If the media guidance application determines at step 1008 that a comparable alternative action can be performed by user media device 610, the media guidance application may automatically replace the requested action with the alternative action and proceed based on the alternative action at step 1012. At the same time, the media guidance application may also transmit an indication to user equipment device 502 that an alternative action will be performed. Alternatively, at step 1012, the media guidance application may transmit an indication to user equipment device 502 that an alternative action can be performed, and wait until a response approving or disapproving the alternative action and/or containing a new instruction data structure requesting the alternative action is received.

At step 1006, the media guidance application may select a new, second instruction data structure. The second instruction data structure may be based on a template instruction data structure retrieved with the device specific information for user media device 610, may be a copy of the received instruction data structure, and/or be selected based on the requested or alternative action. For example, each of user media device 608 and user media device 610 may each have their own template instruction data structure stored as part of their device specific information, and the media guidance application may utilize the template instruction data structure for user media device 610, since that was the user media device selected by the media guidance application. User media device 608 and/or user media device 610 may also have different template instruction data structures for different actions, such as a template instruction data structure for causing user media device 608 and/or user media device 610 to select and begin playing a particular media asset and a different template instruction data structure for causing user media device 608 and/or user media device 610 to pause playing an already displayed media asset.

The media guidance application may, at step 1014, populate or otherwise modify the second instruction data structure. This may involve, for example, copying fields form the received instruction data structure into the second instruction data structure so that the second instruction data structure causes user media device 610 to perform the requested action. This may further involve adjusting these fields based on the retrieved device specific information in order to contain corresponding values expected by user media device 610. This may also involve renaming tags or converting units of variables that were part of the received instruction data structure. Furthermore, some fields of the second instruction data structure, such as an address or other information designating user media device 610, may need to be populated from scratch based on the retrieved device specific information.

At step 1016, the media guidance application may identify transmission information of the retrieved device specific information, such as a specific transmission scheme, a network protocol to be utilized and/or routing information. The media guidance application may then transmit the second instruction data structure, which, at least by this step, is a device specific instruction data structure, to user media device 610 at step 1018.

It will be apparent to those of ordinary skill in the art that the systems and methods involved in the present application may be embodied in a computer program product that includes a computer usable, non-transitory, and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

It is understood that the various features, elements, or processes of the foregoing figures and description are interchangeable or combinable to realize or practice the implementations describe herein. Those skilled in the art will appreciate that aspects of the application can be practiced by other than the described implementations, which are presented for purposes of illustration rather than of limitation, and the aspects are limited only by the claims which follow.

What is claimed is:

1. A method for transmitting instructions to a user media device, the method comprising:
   receiving, from a user equipment device, a user request to log into a first user account associated with a media service, wherein the first user account has access to a first version of media content;

receiving a first instruction data structure from the user equipment device, wherein the first instruction data structure comprises a request for an action to be performed on media content wherein the action is to play the first version of media content;

determining a location of the user equipment device;

selecting a first of a plurality of user media devices based on the determined location, wherein a location of the first user media device is closer in proximity to the determined location of the user equipment device than a location of another user media device of the plurality of user media devices, wherein the first user media device is associated with a second user account associated with the media service, and wherein the second user account has access to a second version of media content but does not have access to the first version of media content;

retrieving device specific information associated with the first user media device;

determining, based on the retrieved device specific information, if the first user media device is authorized to perform the requested action;

translating, based on the retrieved device specific information, the received first instruction data structure into a second instruction data structure appropriate for the first user media device, wherein translating the received first instruction data structure comprises:

determining that the second user account does not have access to the first version of media content; and populating the second instruction data structure with instructions for the first user media device to play the second version of media content; and transmitting the second instruction data structure to the first user media device, wherein the second instruction data structure causes the first user media device to play the second version of media content.

2. The method of claim 1, wherein translating the received first instruction data structure comprises:

selecting a template data structure appropriate for the first user media device based on the retrieved device specific information; and populating the template data structure based on the received first instruction data structure to generate the second instruction data structure.

3. The method of claim 1, wherein translating the received first instruction data structure comprises populating an address field in the second instruction data structure based on the retrieved device specific information.

4. The method of claim 1, wherein determining if the first user media device is authorized to perform the requested action occurs prior to receiving the first instruction data structure.

5. The method of claim 4, further comprising:

determining, based on the retrieved device specific information, a set of actions the first user device is authorized to perform;

transmitting the set of actions to the user equipment device; and causing the user equipment device to display selectable indications associated with each of the set of actions, wherein a user selection of an indication associated with the action causes the user equipment device to transmit the first instruction data structure.

6. The method of claim 1, further comprising scanning a home network in order to identify the plurality of user media devices.

7. The method of claim 1, further comprising:

transmitting a request for location information to each of the plurality of user media devices;

receiving, in response to the request, location information from each of the plurality of user media devices; and storing the received location information.

8. The method of claim 1, further comprising:

transmitting a request for device specific information to the first user media device; and receiving the device specific information from the first user media device.

9. The method of claim 1, further comprising:

receiving information identifying the first user media device; and retrieving, based on the received information, the device specific information associated with the first user media device from a remote server.

10. A system for transmitting instructions to a user media device, the system comprising control circuitry configured to:

receive, from a user equipment device, a user request to log into a first user account associated with a media service, wherein the first user account has access to a first version of media content;

receive a first instruction data structure from the user equipment device, wherein the first instruction data structure comprises a request for an action to be performed on media content wherein the action is to play the first version of media content;

determine a location of the user equipment device;

select a first of a plurality of user media devices based on the determined location, wherein a location of the first user media device is closer in proximity to the determined location of the user equipment device than a location of another user media device of the plurality of user media devices, wherein the first user media device is associated with a second user account associated with the media service, and wherein the second user account has access to a second version of media content but does not have access to the first version of media content;

retrieve device specific information associated with the first user media device;

determine, based on the retrieved device specific information, if the first user media device is authorized to perform the requested action;

translate, based on the retrieved device specific information, the received first instruction data structure into a second instruction data structure appropriate for the first user media device, wherein translating the received first instruction data structure comprises:

determining that the second user account does not have access to the first version of media content; and populating the second instruction data structure with instructions for the first user media device to play the second version of media content; and transmit the second instruction data structure to the first user media device, wherein the second instruction data structure causes the first user media device to play the second version of media content.

11. The system of claim 10, wherein the control circuitry is configured to translate the received first instruction data structure by being further configured to:

select a template data structure appropriate for the first user media device based on the retrieved device specific information; and populate the template data structure based on the received first instruction data structure to generate the second instruction data structure.

12. The system of claim 10, wherein the control circuitry is configured to translate the received first instruction data structure by being further configured to populate an address field in the second instruction data structure based on the retrieved device specific information.

13. The system of claim 10, wherein the control circuitry is further configured to determine if the first user media device is authorized to perform the requested action prior to receiving the first instruction data structure.

14. The system of claim 13, wherein the control circuitry is further configured to:
determine, based on the retrieved device specific information, a set of actions the first user device is authorized to perform;
transmit the set of actions to the user equipment device; and
cause the user equipment device to display selectable indications associated with each of the set of actions, wherein a user selection of an indication associated with the action causes the user equipment device to transmit the first instruction data structure.

15. The system of claim 10, wherein the control circuitry is further configured to scan a home network in order to identify the plurality of user media devices.

16. The system of claim 10, wherein the control circuitry is further configured to:
transmit a request for location information to each of the plurality of user media devices;
receive, in response to the request, location information from each of the plurality of user media devices; and
store the received location information.

17. The system of claim 10, wherein the control circuitry is further configured to:
transmit a request for device specific information to the first user media device; and
receive the device specific information from the first user media device.

18. The system of claim 10, wherein the control circuitry is further configured to:
receive information identifying the first user media device; and
retrieve, based on the received information, the device specific information associated with the first user media device from a remote server.

* * * * *